US009785284B2

(12) United States Patent
Sandblad et al.

(10) Patent No.: US 9,785,284 B2
(45) Date of Patent: *Oct. 10, 2017

(54) TOUCH SCREEN DEVICE

(71) Applicant: Sony Corporation, Tokyo (JP)

(72) Inventors: Andreas Sandblad, Lund (SE); Magnus Midholt, Lund (SE); Magnus Johansson, Dösjebro (SE); Ola Thörn, Limhamn (SE); Olivier Moliner, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 14/670,506

(22) Filed: Mar. 27, 2015

(65) Prior Publication Data
US 2016/0283035 A1 Sep. 29, 2016

(51) Int. Cl.
G06F 3/041 (2006.01)
G06F 3/044 (2006.01)
G06F 3/0488 (2013.01)

(52) U.S. Cl.
CPC ............ G06F 3/0418 (2013.01); G06F 3/041 (2013.01); G06F 3/044 (2013.01); G06F 3/0412 (2013.01); G06F 3/04883 (2013.01)

(58) Field of Classification Search
CPC ........ G06F 3/041; G06F 3/044; G06F 3/0488; G06F 3/04883; G06F 21/32; G06F 21/36; G06F 3/04886; G06F 2203/04105; G06F 2203/04106; H04L 63/083
See application file for complete search history.

(56) References Cited

U.S. PATENT DOCUMENTS

| 2009/0284495 | A1* | 11/2009 | Geaghan | G06F 3/0416 345/174 |
| 2010/0128002 | A1* | 5/2010 | Stacy | G06F 3/016 345/174 |
| 2011/0167391 | A1* | 7/2011 | Momeyer | G06F 1/1684 715/863 |
| 2012/0023459 | A1* | 1/2012 | Westerman | G06F 3/03547 715/863 |
| 2012/0068946 | A1* | 3/2012 | Tang | G06F 3/0488 345/173 |
| 2013/0298055 | A1 | 11/2013 | Kao et al. | |
| 2014/0028575 | A1* | 1/2014 | Parivar | G06F 3/0414 345/173 |
| 2014/0168126 | A1 | 6/2014 | Yu | |
| 2016/0062545 | A1* | 3/2016 | Lai | G06F 3/04886 345/174 |
| 2016/0259458 | A1* | 9/2016 | Johansson | G06F 3/0414 |

FOREIGN PATENT DOCUMENTS

| CA | EP 2463798 A1 * | 6/2012 | ............ G06F 3/041 |
| EP | 2 469 381 | 6/2012 | |

OTHER PUBLICATIONS

International Search Report and Written Opinion dated Jan. 19, 2016 for corresponding International Application No. PCT/EP2015/073384 filed Oct. 9, 2015.

* cited by examiner

Primary Examiner — Bryan Earles
(74) Attorney, Agent, or Firm — Renner, Otto, Boisselle & Sklar, LLP

(57) ABSTRACT

The present invention relates to a touch screen device, a handheld device and a method for operating a touch screen device.

13 Claims, 5 Drawing Sheets

TOUCH SCREEN DEVICE

FIELD OF THE INVENTION

The present invention relates to a touch screen device, especially to a touch screen device comprising a position sensor indicating a touch position where the touch screen device is touched by a user. The touch screen device may be usable in a handheld device, for example a so-called smart phone. The present invention relates furthermore to a handheld device comprising the touch screen device and a method for operating the touch screen device.

BACKGROUND OF THE INVENTION

In the field of mobile handheld devices, for example, mobile navigation systems, mobile personal digital assistants and mobile phones, especially so-called smart phones, there is a need and design trend to larger displays. The displays of these devices are usually provided with a touch sensitive surface for detecting a user touching a surface of the display for operating the device. However, the overall size of the devices is required to be small enough to be held in a comfortable way within one hand and to be stowed in a pocket or in a small handbag. Therefore, the bezels around the displays of mobile devices are getting smaller or they may be completely omitted. For example, the whole front surface of a mobile phone may be covered by the display or touch screen.

FIG. 1 shows such a mobile handheld device 10, for example a smart phone, having a touch screen 11 comprising a touch sensitive surface covering the whole front surface of the mobile handheld device 10. As can be seen from FIG. 1, the fingers of the hand which holds the mobile device 10 may touch the touch screen 11 and this may be detected by a capacitive touch sensor and may cause usability problems. In the example shown in FIG. 1, the mobile handheld device 10 is held between fingers 40 to 42 on the left-hand side and the thumb and the part of hand palm 43 on the right-hand side. Due to holding the device as shown in the example of FIG. 1, the finger tips of fingers 41 and 42 are touching the touch screen 11 in areas 31 and 32, respectively, and the part of the hand palm 43 touches the touch screen 11 in area 33.

Therefore, there is a need to distinguish a touch of fingers holding the mobile handheld device from a touch of fingers which are actually interacting with a user interface of the mobile device.

SUMMARY OF THE INVENTION

According to an embodiment of the present invention, a touch screen device is provided which comprises a touch position sensor unit and a processing unit. The touch position sensor unit is configured to determine a touch position information which represents a touch position where a touch surface of the touch screen device is touched by an object, for example by a finger or a part of a hand of a user holding and operating the touch screen device. The touch position sensor unit may comprise, for example, a capacitive sensor unit arranged in connection with the touch surface and configured to determine a change of capacitance when the object, for example the finger of the user, is approaching or touching the touch surface. The capacitive sensor unit may comprise a plurality of sensor units arranged such that a position where the touch surface is touched by the object may be determined. The processing unit may be coupled to the touch position sensor unit and may receive the touch position information for processing. Based on the processing, the processing unit is configured to determine a touch down position which indicates a touch position of a first contact or approach between the object and the touch screen device. Furthermore, the processing unit is configured to determine based on the touch position information a temporal sequence of touch positions of the object touching the touch screen device after the first contact. Depending on the touch down position, the processing unit is configured to either queue the touch down position and the temporal sequence of the touch down positions, or to output the touch down position and the temporal sequence of touch positions for further processing. In other words, depending on the position where the user or object is first touching the touch surface, the touch position information concerning the touch is either directly forwarded for further processing to an application, or is intermediately stored in a queue or a memory. In case the touch down position and the temporal sequence of touch positions is queued, this information may be forwarded for further processing depending on the temporal sequence of touch positions as will be explained in detail in the following embodiments. The "further processing" may comprise for example processing of the touch down position and the temporal sequence of touch positions by an application of a mobile handheld device in which the touch screen device is arranged. For example, if the touch down position was detected in a central area of the touch surface, the touch down position and the temporal sequence of following touch positions may be directly forwarded to the application for further processing, as it can be assumed that this touch event relates to an intended touch for operating the application. Such intended touch events may be called in the following also "true touch events". On the other hand, if the first contact of the touch event was detected in an edge area or peripheral area of the touch surface of the touch screen device, a further investigation may be needed to distinguish an intended touch event from an unintended touch event. Unintended touch events will be called in the following also "false touch events" and may result from touches for holding the handheld device. Depending on the further investigation of the touch event, the touch event may be confirmed and may be forwarded for further processing to an application, or may be rejected by discarding all information related to this false touch event. False touch events may result from fingers holding the touch screen device around an edge or circumference of the touch screen device and exciting the touch position sensor unit unintentionally.

According to an embodiment, the touch surface has a circumferential edge. The processing unit is configured to queue the touch down position and the temporal sequence of touch positions if the touch down position is within a predefined distance to the circumferential edge. Furthermore, the processing unit is configured to output the touch down position and the temporal sequence of touch positions for further processing if the touch down position is outside the predefined distance to the circumferential edge. As the problem with the false touch events mainly occurs around the boarder or edges of the touch screen device, the touch down position and the temporal sequence of touch positions may be directly output for further processing if the touch event started outside the predefined distance to the circumferential edge, i.e. in the central area of the touch surface. In case the touch event started within the predefined distance to the circumferential edge, further analysis of the touch event is needed to distinguish a true touch event from a false touch event, and therefore the touch down position and the temporal sequence of touch positions is queued. The predefined distance defining the width of the border area or edge area may be in a range of 2 to 10 mm, preferably in a range of 4 to 7 mm, and may have preferably a value of 5 mm. Therefore, touch events starting outside the edge area or border area in which unintended touches may typically occur from fingers holding the touch screen device, may be directly output for further processing, whereas touch events within the border area or edge area may be subjected a further consideration and may be therefore queued.

According to another embodiment, the processing unit is configured to start a timer upon determining the touch down position, and to determine a distance of movement of the object based on the touch down position and the temporal sequence of touch positions. Furthermore, based on the timer, the processing unit determines if the distance of movement exceeds a predefined distance threshold within a predefined time period. If the distance of movement exceeds the predefined distance threshold within the predefined time period, the processing unit outputs the queued touch down position and the temporal sequence of touch positions for further processing. Furthermore, the processing unit may be configured to discard the queued touch down position and the temporal sequence of touch positions if the distance of movement does not exceed the predefined distance threshold within the predefined time period.

If the touch surface is touched unintentionally, for example in an edge area or circumferential area of the touch surface, by a user holding the touch screen device, there will be usually no or only very little movement such that such a false touch event can be easily distinguished from a true touch event which shows a distance of movement exceeding the predefined distance threshold within a considerably short time period, for example within the predefined time period.

In case the queued touch down position and the temporal sequence of touch positions have been discarded due to the exceeded predefined time period, the processing unit may be configured to discard subsequent touch position information until the contact between the object and the touch surface ends. In other words, once a touch event is identified as a false touch event, the whole touch event including the touch down position, the temporal sequence of touch positions and all following touch position information will be discarded until the touch event ends and the object is lifted from the touch surface.

According to another embodiment, in case the distance of movement exceeds the predefined distance threshold within the predefined time period, the processing unit is configured to output the queued temporal sequence of touch positions in a temporally accelerated manner, while further touch positions are queued. In other words, if it is determined by the processing unit that the queued touch down position and temporal sequence of touch positions are related to a true touch event, this information is output for further processing in an accelerated manner to, for example, an application. While outputting the queued information to the application, further touch positions may be queued. By outputting the queued information in a temporally accelerated manner, the queued information output may catch up the currently captured touch positions such that a time delay which was introduced by queuing the touch positions is reduced and a touch event may be processed by the application in real time after a short phase of catching up.

According to an embodiment, the predefined time period within which the distance of movement has to exceed the predefined distance threshold to identify a true touch event, may comprise a value in a range of 10 to 200 ms, preferably a value in a range of 16 to 50 ms. A time period within these ranges enables a reliable distinction between true and false touch events and at the same time the delay introduced by queuing the touch information for this time period is short enough to be tolerated by a user using the touch screen device.

According to another embodiment, the processing unit is configured to start a timer upon determining the touch down position and to determine based on the timer, a time period from the first contact until the contact between the object and the touch surface ends. If the determined time period does not exceed a predefined time period, the queued touch down position and the queued temporal sequence of touch positions is output for further processing by the processing unit. In other words, if the whole touch event starting from the first contact between the object and the touch surface and ending when the touch object is lifted from the touch surface, is shorter than a predefined time period, the queued touch down position and the temporal sequence of touch positions is output for further processing. The predefined time period may comprise a value in a range of 10 to 200 ms, preferably a value in a range of 16 to 50 ms. A touch event with such a short duration may typically be a tap event performed by a user tapping an icon or control element for activating a function or application. Therefore, such a short touch event may be considered as a true touch event, because an unintentional touch of the touch screen device leads usually to a longer contact between the object and the touch surface. Consequently, the processing unit will be configured to discard the queued touch down position and the queued temporal sequence of touch positions if the determined time period of the touch event exceeds the predefined time period, because touch events of longer duration, having no or only a neglectable movement, may be considered as false touch events.

According to a further embodiment, the position sensor unit comprises a capacitive sensor unit which is configured to determine the touch position information based on a change in capacitance at the position where the touch surface is touched by the object, for example by a finger of a user using the touch screen device. For example, the position sensor unit may provide a two-dimensional position information concerning the touch position.

According to another embodiment, a handheld device is provided which comprises a housing and a touch screen device. A touch surface of the touch screen device constitutes at least a part of at least one surface of the housing. At least a part of an edge of the touch surface coincides with a part of an edge of the housing. For example, the housing may have a cubic form and the touch screen device constitutes one complete surface area of the cubic form. The touch screen device may comprise a display extending along the touch surface such that information may be displayed by the display all over the touch surface including edge areas where the touch surface contacts corresponding side surfaces of the cubic housing. The touch screen device comprises for example an embodiment of the above described touch screen devices. In particular, the touch screen device comprises a touch position sensor unit configured to determine a touch position information representing a touch position where the touch surface of the touch screen device is touched by an object. The touch position sensor unit may be configured to determine the touch position information for touch positions all over the touch surface including edge areas where the touch surface is joined to side surfaces of the cubic housing. The touch screen device comprises furthermore a processing unit which is configured to determine based on the touch position information a touch down position indicating a touch position of a first contact between the object and the touch screen device, and a temporal sequence of touch positions of the object touching the touch screen device after the first contact. Depending on the touch down position, the processing unit selectively either queues the touch down position and the temporal sequence of touch positions, or outputs directly the touch down position and the temporal sequence of touch positions for further processing. The touch down position and the temporal sequence of touch positions may be output for further processing to an application of the handheld device or an operating system of the handheld device.

The handheld device may comprise, for example, a mobile telephone, especially a so-called smart phone, a mobile computer, a personal digital assistant, a tablet computer, a mobile media player, a mobile navigation system, a smart watch or other wearables. Furthermore, the invention may also be used in internet of things devices (IoT) or network home appliances, for example.

According to another embodiment of the present invention, a method is provided which comprises the following steps. A touch position information representing a touch position where a touch surface of a touch screen device is touched by an object is determined by a touch position sensor unit. Based on the touch position information a processing unit determines a touch down position indicating a touch position of a first contact between the object and the touch screen device, and a temporal sequence of touch positions of the object touching the touch screen device after the first contact. The processing unit may comprise for example a microprocessor or controller. Depending on the touch down position, the processing unit selectively either queues the touch down position and the temporal sequence of touch positions, or outputs the touch down position and the temporal sequence of touch positions for further processing.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the Figures may be a direct or indirect coupling unless specifically noted otherwise. Same reference signs in the various drawings refer to similar or identical components.

Figure 1:
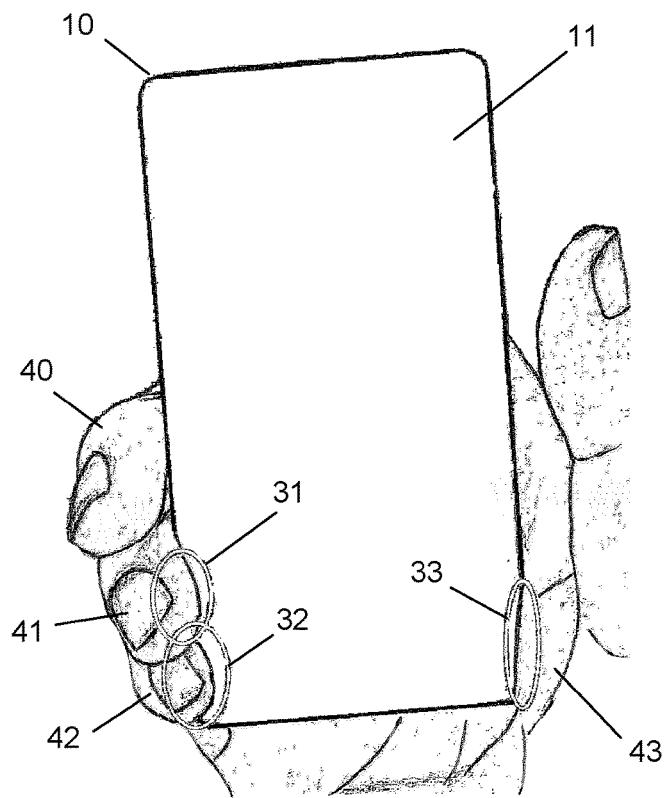
FIG. 1 shows schematically a hand of a user holding a handheld device.

FIG. 1 shows a handheld device 10, for example a mobile telephone, in particular a so-called smart phone, with a touch screen device 11 covering the whole front surface of the handheld device 10. This means that the touch screen device 11 is not surrounded by a bezel, but edges of the touch screen device 11 coincide with the edges of the housing of the handheld device 10 such that the whole front surface of the handheld device 10 may be used to display information to a user and to receive operation commands from the user by touching the touch surface of the touch screen device 11.

As can be seen from FIG. 1, the user may accidentally or unintentionally touch the touch surface of the touch screen device 11 with fingers 41, 42 or the hand palm 43 in areas indicated in FIG. 1 by reference signs 31 to 33. Touch events in the exemplary areas 31 to 33 based on unintentional touches when the user is holding the handheld device 10 will be called in the following false touch events. Intentional touches by the user for operating applications and functions of the handheld device 10 will be called in the following true touch events.

Figure 2:
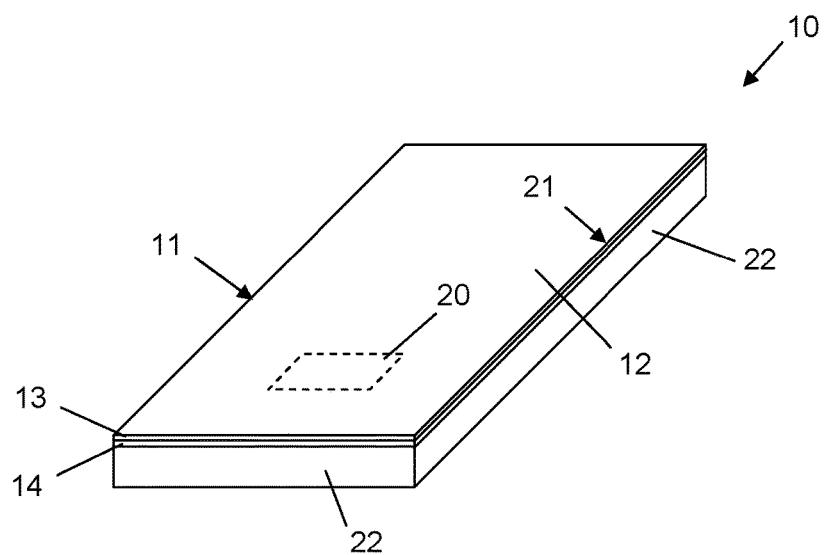
FIG. 2 shows schematically a perspective view of a handheld device according to an embodiment of the present invention.

FIG. 2 shows schematically a perspective view of the handheld device 10 of FIG. 1 in more detail. An upper side or front side of the handheld device 10 consists of the touch screen device 11. The touch screen device 11 comprises for example a touch surface 12, which is made for example of glass, and a display layer 13 comprising for example a liquid crystal display (LCD) for generating visual images on the touch surface 12. The touch screen device 11 may comprise furthermore a touch position sensor unit 14, for example a capacitive touch sensor layer configured to determine the touch position information representing a position where the touch surface 12 is touched by an object, for example by a finger of a user. The touch screen device 11 may comprise additionally a processing unit 20, for example a microprocessor or controller, coupled to the touch position sensor unit 14. The processing unit 20 may additionally be coupled to the display layer 13 for driving the liquid crystal of the display layer 13.

The circumferential edge 21 of the touch screen device 11 coincides or constitutes an edge of the handheld device 10 such that the edge 21 joins the touch surface 12 and side surfaces 22 of the handheld device 10. As there is no or only a very small bezel surrounding the touch surface 12, a large usable area of the touch screen device 11 can be provided to the user covering the whole front surface of the handheld device 10 for displaying data to the user and for receiving touch information from the user for operating applications and functions of the handheld device 10. However, false touch events caused by fingers of the user holding the handheld device 10 may occur as the skin of the fingers may bend around the edge 21 and excite the capacitive touch position sensor unit 14 as indicated by areas 31 to 33 in FIG.

1. In normal use, the fingers holding the handheld device 10 are relatively static compared to fingers used for touch interaction. Therefore, when a touch near the edge is determined, this may potentially be a true touch event or a false touch event. A distinction between a true touch event and a false touch event may be performed by analysing the dynamic movement of the finger touching the touch surface 12. Determining if a touch event is a true touch event or a false touch event will be called in the following also classifying a touch event as a false touch event or as a true touch event, or as filtering.

A classification of a touch event as a true touch event or as a false touch event may be performed for example by a touch device driver of the handheld device 10. As an alternative, the classification may be performed also within a touch firmware of the touch screen device 11 or in higher software layers of the handheld device 10. When a finger first touches the touch surface 12, the corresponding touch position information is not immediately forwarded to an application for further processing, but instead it is queued and initially considered as a "potential" touch event. To qualify the touch event as a confirmed or true touch event, the finger will have to move more than a distance d within a time t as will be described below.

As the problem with false touch events only occurs around the borders of the touch surface 12, different threshold values for d and t may be used depending on where the first touch contact on the touch surface 12 is detected. Close to the edge of the touch surface 12, a time threshold T may be short and a distance threshold L may be large, while towards the centre of the touch surface 12 the time threshold T may be long (could be infinite) and L may be short (could be zero).

Figure 3:
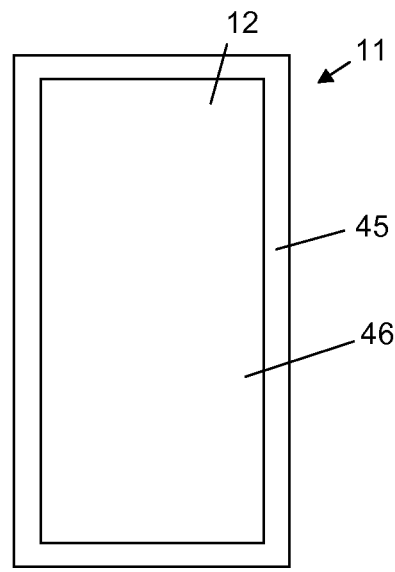
FIG. 3 shows a top view of a touch screen device according to an embodiment of the present invention.
Figure 4:
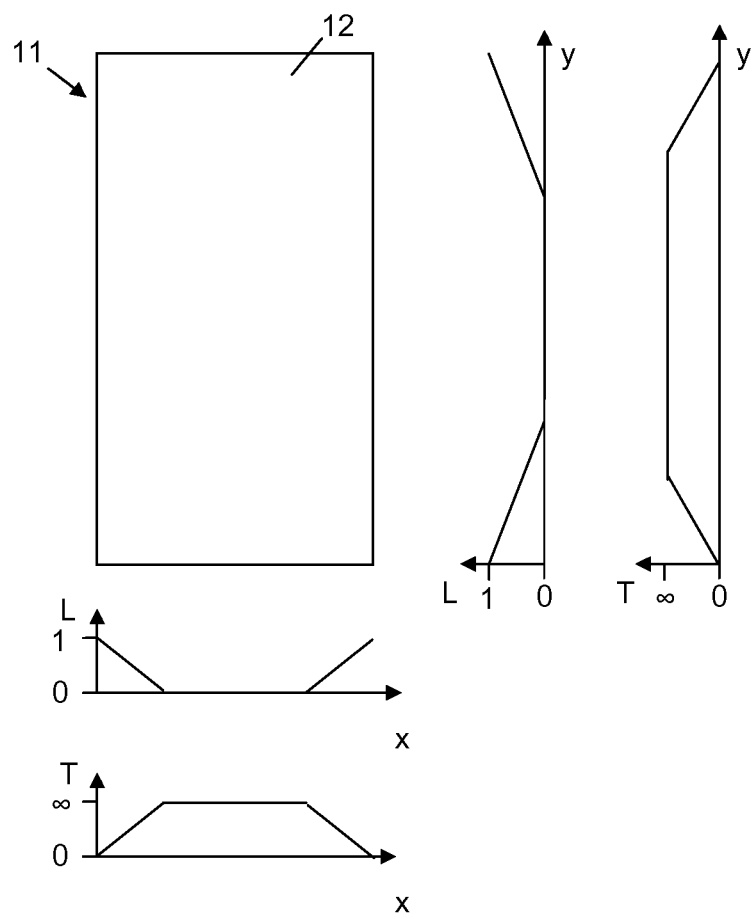
FIG. 4 shows a top view of a touch screen device according to another embodiment of the present invention.

Two different thresholding schemes for the distance threshold L and the time threshold T are shown in FIGS. 3 and 4, respectively. In FIG. 3 the touch surface 12 of the touch screen device 11 is divided into two concentric areas, a border area 45 and a central area 46. The width of the border area 45 may be in the range of a few millimeters, for example in a range of 4 to 7 mm, for example 5 mm. In the border area 45, the distance threshold L may be in the range of a few millimeters, for example 2 to 5 mm and the time threshold T may be in a value range of 10 to 200 ms, preferably in a value range of 16 to 50 ms. In the central area 46, the distance threshold L may have a value of 0 and the time threshold T may be infinite. Thus, when a touch event starts within the central area 46, such a touch event is immediately confirmed as a true touch event, whereas a touch event starting in the border area 45 is considered as a true touch event only if the finger moves more than the distance threshold L within the time threshold T. Therefore, touch position information relating to a touch event starting in the border area 45 is queued until the touch event is classified as either being a true touch event or a false touch event.

As an alternative, the distance threshold L and the time threshold T may be a function of the distance to the border, as shown in connection with FIG. 4. At the border the distance threshold L has a maximum value which is represented by a value 1 in FIG. 4 which could be a relative value representing for example 2 or 5 mm. As shown in FIG. 4, in the x-direction, the distance threshold L starts at the edge of the touch surface 12 with a value of one and gradually decreases to a central area in the x-direction to a value of 0. From the central area to the right edge of the touch surface 12, the distance threshold L gradually increases from 0 to 1. In the y-direction, the distance value also starts at the bottom with a value of 1 and gradually decreases to 0 in the central area in the y-direction, and then gradually increases to a value of 1 at the upper edge of the touch surface 12. However, any other function of the distance threshold L depending on the position on the touch surface 12 may be used, for example, a stepped function or a parabolic function. The time threshold T starts in the x-direction at the left edge of the touch surface 12 with a value of 0 and increases to a central area of the touch surface 12 to a very large value, for example infinite or a value of several seconds or minutes, e.g. 50 seconds. From the central area to the right edge of the touch surface, the time threshold T gradually decreases from the large value to 0. The same course for the time period threshold is defined in the vertical y-direction from the lower edge to the upper edge of the touch surface 12 as indicated in FIG. 4. With the gradually changing distance threshold L and time threshold T the conditions for classifying a true touch event or a false touch event are gradually changing from the border to the centre of the touch surface 12. Near the border, a touch event will be qualified as a true touch event if the finger moves significantly within a very short time. Coming closer to the central area of the touch surface 12, the moving distance needed to qualify a touch event as a true touch event decreases and also the time to perform this movement increases, such that also slower and less extensive touch events may be considered as true touch events.

Figure 5:
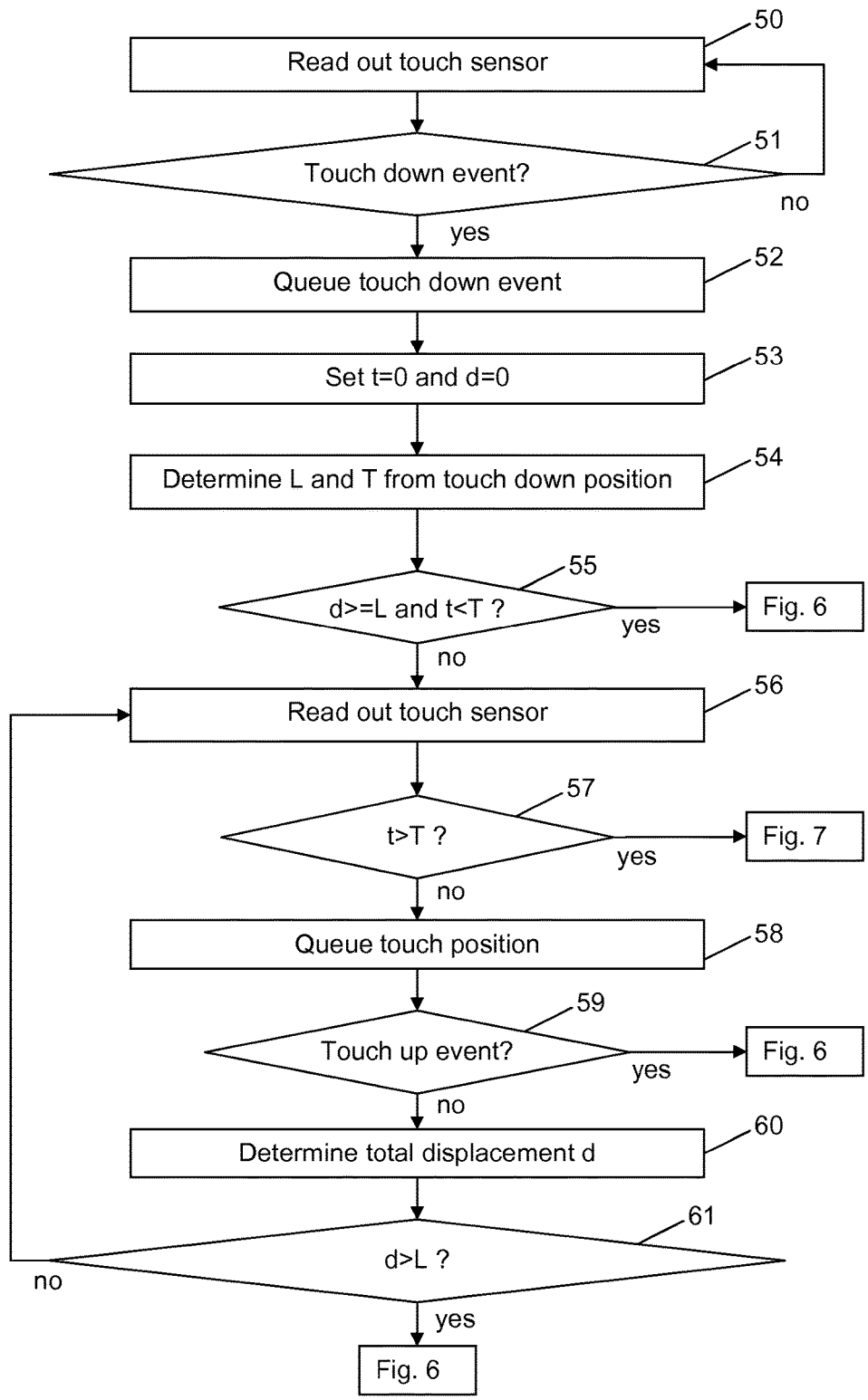
FIGS. 5 to 7 show flow charts comprising method steps of a method for operating a touch screen device according to an embodiment of the present invention.
Figure 6:
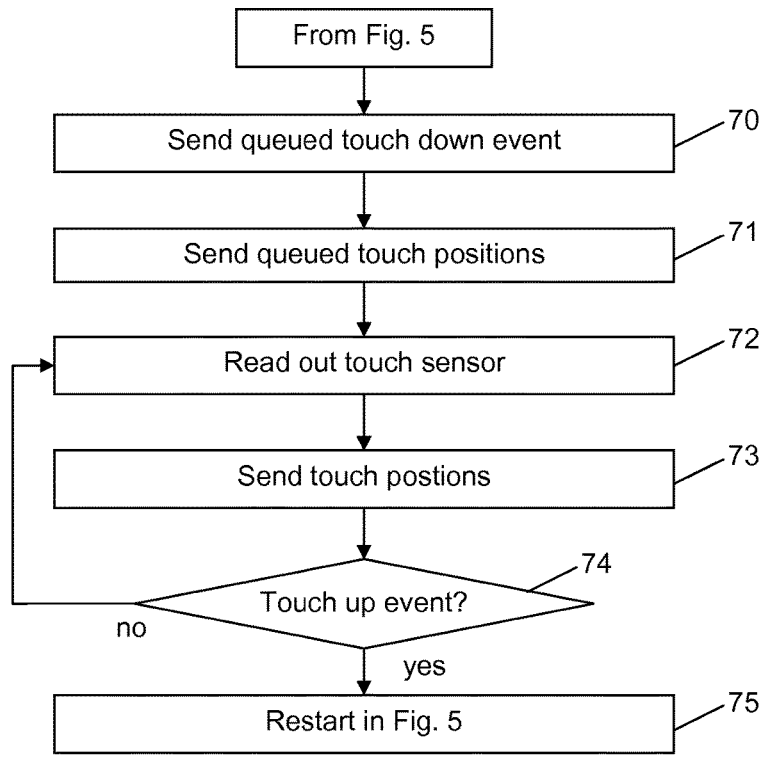
Figure 7:
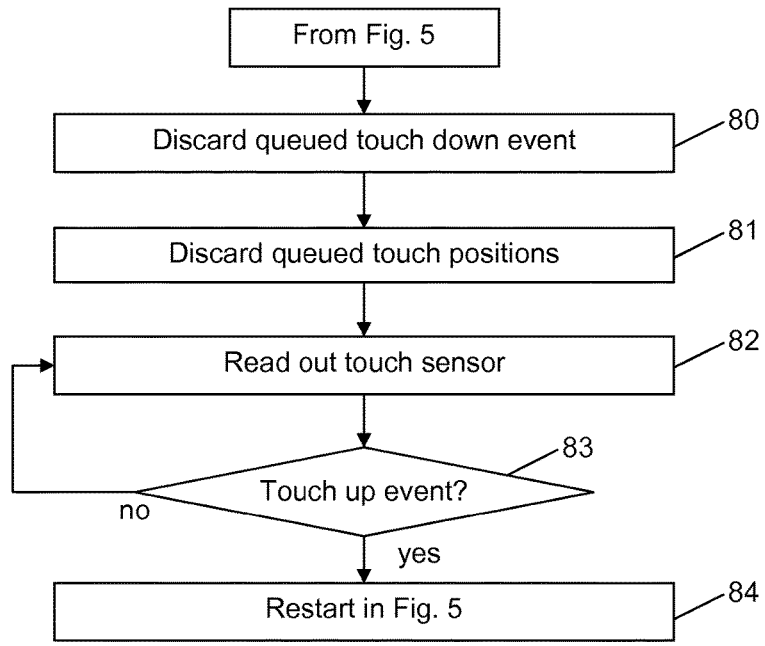
Figure 8:
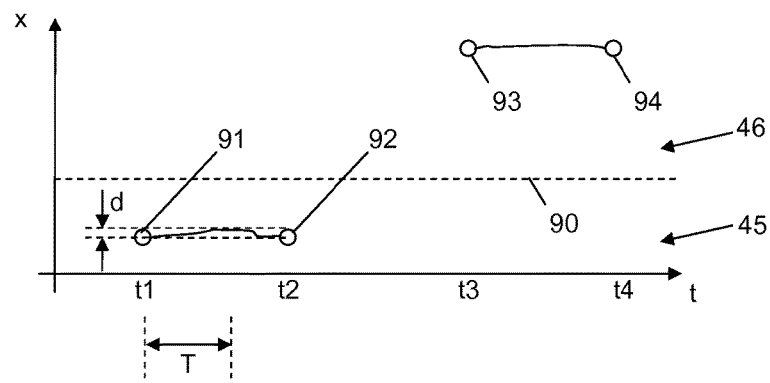
FIG. 8 illustrates a detection of a true touch event and a false touch event according to embodiments of the present invention.
Figure 9:
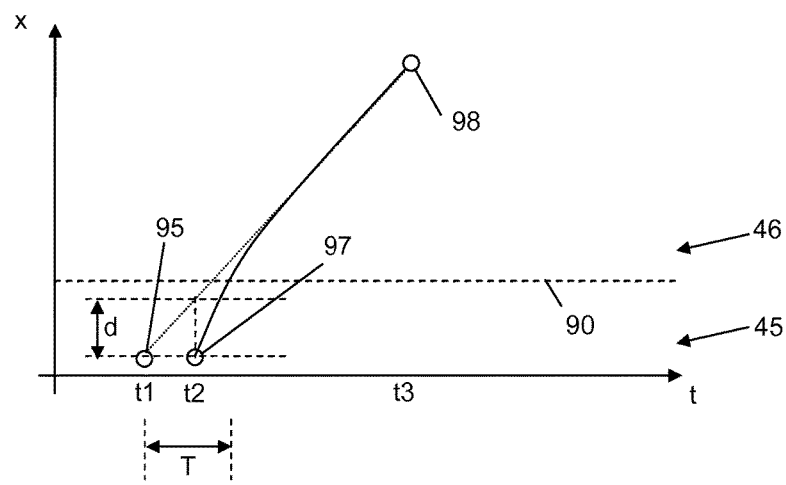
FIG. 9 illustrates a detection of a true touch event according to another embodiment of the present invention.
Figure 10:
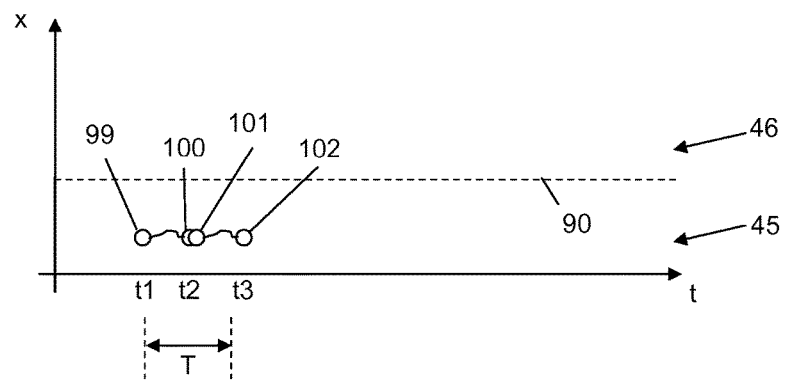
FIG. 10 illustrates a detection of a true single tap touch event according to an embodiment of the present invention.

Operation of the processing unit 20 will be described in the following in more detail with reference to FIGS. 5 to 10. FIGS. 5 to 7 show method steps performed by the processing unit 20 and FIGS. 8 to 10 show exemplary touch events as a movement x over time t. The movement x may be any direction along the surface of the touch surface 12 and is not restricted to direction x shown in FIG. 4. Rather, the movement x relates to an arbitrary direction with respect to an edge or border of the touch screen device 11. In the following exemplary description of touch events and the processing of the touch events, a distance threshold L and a time threshold T are assumed to be defined as described above in connection with FIG. 3, i.e. the time threshold T has a fixed value within the border area 45 and also the distance threshold L has a fixed value within the border area 45. In the central area 46, the distance threshold may be 0 and the time period threshold may be infinite. The border area 45 and the central area 46 are also indicated in FIGS. 8 to 10 and separated by a horizontal dashed line 90.

In a first example shown in FIG. 8, a touch down event 91 occurs at time t1 and is followed by a movement to a touch up event 92 at time t2. The touch down event 91 occurred in the border area 45. The distance of movement between the touch down event 91 and the touch up event 92 is indicated by d. The time difference between t1 and t2 is longer than the time threshold T in the example of FIG. 8. It is assumed that the distance of movement d is smaller than the distance threshold L and therefore this touch event may indicate a false touch event. The processing and classification of this touch event by the processing unit 20 will be described in the following with respect to FIGS. 5 and 7.

In step 50, a touch sensor of the touch surface 12 is read out. The processing unit determines from the information from the touch sensor if a touch is present or not. As long as there is no touch down event (step 51), the method continues in step 50. When the touch down event 91 is detected in step 51, this touch down event 91 is queued in step 52. Furthermore, in step 53, a timer is started (t=0) and a total displacement is reset (d=0). In step 54, the distance threshold L and the time threshold T are determined from the touch down position, for example as a function of the position as indicated in FIG. 4 or, as described above, according to FIG. 3. The touch down event 91 occurred in the border area 45 and therefore the time threshold T is set, for example, to a value of 10 to 200 ms and the distance threshold L may be set, for example, to a value in the range of 2 to 5 mm. For example, the time threshold may be set to 50 ms and the distance threshold may be set to 4 mm. In step 55, the total displacement d is compared to the distance threshold L and the timer t is compared to the time threshold T. As the total displacement d is still 0, further touch sensor values are read out in step 56. As long as the timer t has not exceeded the time threshold T (step 57), the further touch positions are queued in step 58. As long as no touch up event has been determined in step 59, the total displacement d is determined (step 60), and as long as the total displacement d does not exceed the distance threshold L (step 61), the method continues in step 56. As indicated in FIG. 8 and described above, the total displacement d indicated in FIG. 8 does not exceed the distance threshold L and, therefore, after a few iterations of steps 56 to 61, the timer t will exceed the time threshold T in step 57. Therefore, the method then continues with the method steps of FIG. 7. The movement of the finger within the time threshold T was not large enough to exceed the distance threshold L and therefore, the touch event is considered as a false touch event. As shown in FIG. 7, in step 80 the queued touch down event is discarded, and in step 81 the queued touch positions which followed the touch down event are also discarded. In step 82 the touch sensor is read out and in step 83 it is determined if a touch up event has occurred. If there was no touch up event, the method continues in step 82 to read out the touch sensor. The information from the touch sensor read out in step 82 is also discarded as it belongs to the false touch event. When in step 83 the touch up event 92 is detected, the method continues with the next touch event in FIG. 5 (step 84).

The next example shown in FIG. 8 relates to a touch event starting with a touch down event 93 at time t3 in the central area 46 and which ends with a touch up event 94 at time t4. The processing unit 20 recognises the touch down event 93 in steps 50 and 51 as described above. The touch down event 93 is queued in step 52, and the timer is started and the total displacement d is set to 0 in step 53. The distance threshold L and the time threshold T are determined from the touch down position 93. As the touch down position 93 is within the central area 46, the distance threshold L is set to 0 and the time threshold T is set to a very large value, for example indefinite. Therefore, in step 55 the total displacement d is equal to the distance threshold L and the timer t does not exceed the time threshold T. Hence, a true touch event is recognised and the method is continued in FIG. 6. In step 70 the queued touch down event is forwarded to an application for further processing. In step 71 queued touch positions are also forwarded to the application, but in the present example, no further touch positions have been queued such that only the queued touch down event 94 is immediately forwarded to the application for further processing. In steps 72, 73 and 74 further touch positions are determined by reading out the touch sensor (step 72) and sending them directly to the application for further processing (step 73) until in step 74 the touch up event 94 is recognised and this whole touch event is completed. The method may then restart in FIG. 5 (step 75).

FIG. 9 shows what happens when a finger is swiped from the border area 45 to the central area 46. In detail, a touch down event 95 occurs in the border area 45 at time t1 and then the finger which generated the touch down event 95 is moved along the dotted line to the touch up event 98 where the finger is removed from the touch surface 12. As described above in connection with FIGS. 5 and 8, the touch down event 94 is recognised by the processing unit 20 in steps 50 and 51. In step 52 the touch down event 95 is queued. In step 53 the timer is started and the total displacement d is set to 0. From the touch down position of the touch down event 95, the distance threshold L and the time threshold T are determined, for example, L may be set to 4 mm and T may be set to 50 ms which means that starting from the touch down event 95 the finger has to be moved for at least 4 mm within 50 ms to indicate a true touch event. As initially the total displacement d does not exceed the distance threshold L in step 55, the loop comprising steps 56 to 61 is entered. In this loop touch information is determined by reading out the touch sensor (step 56) and queued in step 58 until either the timer exceeds the time threshold T in step 57, or a touch up event is detected in step 59, or the total displacement d exceeds the distance threshold L in step 61. As can be seen from FIG. 8, at time t2 the total displacement d exceeds the distance threshold L before the timer t exceeds the time threshold T. Therefore, the touch event is considered as a true touch event and the method is continued with the method steps of FIG. 6. In step 70 the queued touch down event 95 is sent to an application for further processing. However, due to the queuing, the application receives the touch down event 95 delayed as touch down event 97 at time t2 as indicated in FIG. 8. In step 71 the queued touch positions which occurred after the touch down event 95 are also sent to the application for further processing. However, as indicated in FIG. 8 by the line starting at touch down event 97, the queued touch down positions are sent to the application in a timely accelerated manner such that the delay is reduced. In steps 72 to 74 subsequent touch positions are determined by reading out the touch sensor and are sent to the application for further processing until the touch up event 98 occurs. The further touch positions may also be queued and sent out from the queue to the application in an accelerated manner to smoothly catch up to the real time. As an alternative, the positions of the queued touch positions may be altered so as to smoothly catch up to the current finger trajectory. After catching up, all subsequent touch positions are immediately forwarded to the application for further processing.

In connection with FIG. 10, another example is shown indicating what happens upon a single tap near the edge of the touch surface 12. At t1 the user's finger generates a touch down event 99. The processing unit 20 determines this touch down event 99 as a potential touch in steps 50 to 55 and, therefore, has to analyse in steps 56 to 61 the further course of the touch event to decide if the touch event is a true touch event or a false touch event. As the touch down event 99 has occurred in the border area 45 of the touch screen 12, the finger needs to move at least the distance threshold L (for example 4 mm) within the time threshold T (for example 50 ms) before it is classified as a true touch event and forwarded to an application for further processing. However, as shown in FIG. 10, shortly after t1 the finger leaves at time t2 the screen before the time threshold T is exceeded, as the time difference (t2−t1) is less than T. This touch up event 100 is recognised in step 59 and the touch event is classified as a true touch event and therefore processed by the method steps 70 to 75 of FIG. 6. The touch down event 99 is sent from the queue in a time delayed manner as touch down event 101 to the application. In the same way, the touch up event 100 is sent delayed to the application as touch up event 102 at time t3.

The invention claimed is:

1. A touch screen device, comprising:
   a touch position sensor unit configured to determine a touch position information representing a touch position where a touch surface of the touch screen device is touched by an object,
   a processing unit configured
   to determine based on the touch position information a touch down position indicating a touch position of a first contact between the object and the touch screen device, and a temporal sequence of touch positions of the object touching the touch screen device after the first contact, and,
   depending on the touch down position, selectively
   to either queue the touch down position and the temporal sequence of touch positions, or
   to output the touch down position and the temporal sequence of touch positions for further processing,
   to start a timer upon determining the touch down position,
   to determine a distance of movement of the object based on the touch down position and the temporal sequence of touch positions,
   to determine, based on the timer, if the distance of movement exceeds a predefined distance threshold within a predefined time period,
   if the distance of movement exceeds the predefined distance threshold within the predefined time period, to output for further processing the queued touch down position and the queued temporal sequence of touch positions in a temporally accelerated manner while further touch positions are queued,
   wherein the queued temporal sequence of touch positions is read out from a queue for further processing in a shorter time than a time needed to store the temporal sequence of touch positions in the queue.

2. The touch screen device according to claim 1, wherein the touch surface has a circumferential edge, wherein the processing unit is configured
   to queue the touch down position and the temporal sequence of touch positions if the touch down position is within a predefined distance to the circumferential edge, and
   to output the touch down position and the temporal sequence of touch positions for further processing if the touch down position is outside the predefined distance to the circumferential edge.

3. The touch screen device according to claim 2, wherein the predefined distance comprises a value in a range of 2 to 10 mm, preferably a value in a range of 4 to 7 mm, more preferably a value of 5 mm.

4. The touch screen device according to claim 1, wherein the processing unit is configured to discard the queued touch down position and the temporal sequence of touch positions, if the distance of movement does not exceed the predefined distance threshold within the predefined time period.

5. The touch screen device according to claim 4, wherein the processing unit is configured to discard subsequent touch position information until the contact between the object and the touch surface ends, if the queued touch down position and the temporal sequence of touch positions has been discarded due to the exceeded predefined time period.

6. The touch screen device according to claim 1, wherein the predefined time period comprises a value in a range of 10 to 200 ms, preferably a value in a range of 16 to 50 ms.

7. The touch screen device according to claim 1, wherein the processing unit is configured
   to start a timer upon determining the touch down position, and
   to determine based on the timer, a time period from the first contact until the contact between the object and the touch surface ends, and
   to output the queued touch down position and the temporal sequence of touch positions for further processing if the determined time period does not exceed a predefined time period.

8. The touch screen device according to claim 7, wherein the processing unit is configured to discard the queued touch down position and the temporal sequence of touch positions if the determined time period exceeds the predefined time period.

9. The touch screen device according to claim 7, wherein the predefined time period comprises a value in a range of 10 to 200 ms, preferably a value in a range of 16 to 50 ms.

10. The touch screen device according to claim 1, wherein the position sensor unit comprises a capacitive sensor unit configured to determine the touch position information based on a change in capacitance at the position where the object touches the touch surface.

11. A handheld device comprising:
    a housing, and
    a touch screen device, wherein a touch surface of the touch screen device constitutes at least a part of at least one surface of the housing, and wherein at least a part of an edge of the touch surface coincides with a part of an edge of the housing, wherein the touch screen device comprises:
    a touch position sensor unit configured to determine a touch position information representing a touch position where the touch surface of the touch screen device is touched by an object,
    a processing unit configured to determine based on the touch position information a touch down position indicating a touch position of a first contact between the object and the touch screen device, and a temporal sequence of touch positions of the object touching the touch screen device after the first contact, and,
    depending on the touch down position, selectively to either queue the touch down position and the temporal sequence of touch positions, or to output the touch down position and the temporal sequence of touch positions for further processing,
    start a timer upon determining the touch down position,
    determine a distance of movement of the object based on the touch down position and the temporal sequence of touch positions,
    determine, based on the timer, if the distance of movement exceeds a predefined distance threshold within a predefined time period,
    if the distance of movement exceeds the predefined distance threshold within the predefined time period, output for further processing the queued touch down position and the queued temporal sequence of touch positions in a temporally accelerated manner while further touch positions are queued,
    wherein the queued temporal sequence of touch positions is read out from a queue for further processing in a shorter time than a time needed to store the temporal sequence of touch positions in the queue.

12. The handheld device according to claim 11, wherein the handheld device comprises at least one of a group consisting of a mobile telephone, a mobile computer, a personal digital assistant, a tablet computer, a mobile media player, and a mobile navigation system.

13. A method comprising:

determining, with a touch position sensor unit, a touch position information representing a touch position where a touch surface of a touch screen device is touched by an object, determining, with a processing unit, based on the touch position information, a touch down position indicating a touch position of a first contact between the object and the touch screen device, and a temporal sequence of touch positions of the object touching the touch screen device after the first contact, and selectively depending on the touch down position, either queuing the touch down position and the temporal sequence of touch positions, or outputting the touch down position and the temporal sequence of touch positions for further processing, start a timer upon determining the touch down position, determine a distance of movement of the object based on the touch down position and the temporal sequence of touch positions, determine, based on the timer, if the distance of movement exceeds a predefined distance threshold within a predefined time period, if the distance of movement exceeds the predefined distance threshold within the predefined time period, output for further processing the queued touch down position and the queued temporal sequence of touch positions in a temporally accelerated manner while further touch positions are queued, wherein the queued temporal sequence of touch positions is read out from a queue for further processing in a shorter time than a time needed to store the temporal sequence of touch positions in the queue.

* * * * *